(12) United States Patent
Lazzara et al.

(10) Patent No.: US 8,844,464 B2
(45) Date of Patent: Sep. 30, 2014

(54) SYSTEMS, METHODS, AND DEVICES FOR APPLYING FLUID COMPOSITES TO A CARRIER SHEET

(75) Inventors: Christopher J. Lazzara, Palm Beach Shores, FL (US); Richard J. Lazzara, Palm Beach, FL (US)

(73) Assignee: Neptune Research, Inc., Riviera Beach, FL (US)

(*) Notice: Subject to any disclaimer, the term of this patent is extended or adjusted under 35 U.S.C. 154(b) by 274 days.

(21) Appl. No.: 13/326,547

(22) Filed: Dec. 15, 2011

(65) Prior Publication Data

US 2012/0156378 A1 Jun. 21, 2012

Related U.S. Application Data

(60) Provisional application No. 61/424,869, filed on Dec. 20, 2010.

(51) Int. Cl.
| | | |
|---|---|---|
| *B05C 3/02* | (2006.01) | |
| *B05C 3/12* | (2006.01) | |
| *B29B 15/12* | (2006.01) | |
| *B29C 73/10* | (2006.01) | |

(52) U.S. Cl.
CPC ............... *B29B 15/125* (2013.01); *B29C 73/10* (2013.01)
USPC ............................ 118/420; 118/429; 118/414

(58) Field of Classification Search
CPC ................ B05C 3/02; B05C 3/12; B05C 1/18
USPC .................. 118/419–429, 407, 413; 427/358; 220/661; 138/99
See application file for complete search history.

(56) References Cited

U.S. PATENT DOCUMENTS

| | | | | |
|---|---|---|---|---|
| 2,292,782 A | * | 8/1942 | Erhardt, Jr. | 427/313 |
| 2,586,905 A | * | 2/1952 | Bates | 156/542 |

(Continued)

FOREIGN PATENT DOCUMENTS

| | | | |
|---|---|---|---|
| DE | 3618962 | 12/1987 | ............. B29B 15/12 |
| EP | 0309597 A1 | 4/1989 | |

(Continued)

OTHER PUBLICATIONS

International Search Report mailed Mar. 13, 2012 which issued in corresponding International Patent Application No. PCT/US2011/063675 (6 pages).

(Continued)

*Primary Examiner* — Yewebdar Tadesse
(74) *Attorney, Agent, or Firm* — Nixon Peabody LLP (57) ABSTRACT

Systems, method and devices for applying a fluid composite to a carrier sheet are presented herein. An aspect of this disclosure is directed to a fluid-administering apparatus for applying a fluid composite, such as resins, epoxies, and adhesives, to a carrier sheet, such as a cloth tape. The apparatus includes a support frame with a container buttress, and a container removably received within the container buttress of the support frame. The container has a basin for holding the fluid composite, a lid covering the basin, and first and second scraping surfaces for scraping the carrier sheet. The container also has first and second slots, each of which is defined through a respective opposing side of the container. The carrier sheet passes through the first slot, traverses down into the basin through the fluid composite, slides over the first scraping surface then under the second scraping surface, and passes out through the second slot.

16 Claims, 7 Drawing Sheets

(56) References Cited

U.S. PATENT DOCUMENTS

| | | |
|---|---|---|
| 3,344,770 A | 10/1967 | Schaefer |
| 3,742,106 A | 6/1973 | Price |
| 3,769,126 A | 10/1973 | Kolek ........................ 156/172 |
| 3,770,556 A | 11/1973 | Evans et al. |
| 3,962,990 A | 6/1976 | Phipps et al. |
| 4,032,677 A | 6/1977 | Ichioka et al. |
| 4,076,864 A | 2/1978 | Wallsten |
| 4,183,319 A | 1/1980 | Sakurai et al. |
| 4,200,676 A | 4/1980 | Caponigro et al. |
| 4,341,822 A | 7/1982 | Singer et al. |
| 4,372,994 A | 2/1983 | Haig |
| 4,472,468 A | 9/1984 | Tailor et al. |
| 4,519,856 A | 5/1985 | Lazzara |
| 4,731,273 A | 3/1988 | Bonk et al. |
| 4,732,632 A | 3/1988 | Pieslak et al. |
| 4,803,104 A | 2/1989 | Peigneur et al. |
| 4,961,978 A | 10/1990 | Doheny, Jr. et al. |
| 4,996,941 A | 3/1991 | Mills |
| 5,030,493 A | 7/1991 | Rich |
| 5,060,593 A | 10/1991 | Ruffin et al. |
| 5,114,633 A | 5/1992 | Stewart |
| 5,128,198 A | 7/1992 | Dyksterhouse et al. |
| 5,134,000 A | 7/1992 | Smythe et al. |
| 5,175,032 A | 12/1992 | Steele et al. |
| 5,242,495 A | 9/1993 | Hammond et al. |
| 5,302,428 A | 4/1994 | Steele et al. |
| 5,407,483 A | 4/1995 | Yokoshima |
| 5,411,777 A | 5/1995 | Steele et al. |
| 5,702,528 A | 12/1997 | Paramonov et al. |
| 5,951,762 A | 9/1999 | Shangold et al. |
| 6,207,002 B1 | 3/2001 | Odell et al. |
| 6,495,204 B1 | 12/2002 | Allen et al. |
| 6,540,856 B2 | 4/2003 | Dillinger et al. |
| 6,991,745 B2 | 1/2006 | Fleming |
| 7,155,101 B2 | 12/2006 | Shah et al. |
| 2007/0125437 A1 | 6/2007 | Lazzara |
| 2008/0210554 A1* | 9/2008 | Yoshida et al. ............ 204/275.1 |
| 2009/0130323 A1* | 5/2009 | Elsner ........................... 427/420 |

FOREIGN PATENT DOCUMENTS

| | | | |
|---|---|---|---|
| EP | 0416474 | 3/1991 | ............. B29B 15/12 |
| EP | 0588648 B1 | 4/1998 | |
| FR | 1529246 | 5/1968 | |
| GB | 870165 A1 | 6/1961 | |
| GB | 1065505 | 4/1967 | ............. B29B 15/12 |
| GB | 1078559 B1 | 8/1967 | |
| GB | 2132919 | 7/1984 | ............. B29B 15/12 |
| WO | 90/12235 | 10/1990 | |
| WO | 2002/016482 | 2/2002 | ............. B29B 15/12 |
| WO | 2007/003011 A1 | 1/2007 | |

OTHER PUBLICATIONS

Written Opinion mailed Mar. 13, 2012 which issued in corresponding International Patent Application No. PCT/US2011/063675 (6 pages).
STOPAQ® FN 4100, Product Data Sheet; Dated Apr. 2008; (2 pages).

\* cited by examiner

SYSTEMS, METHODS, AND DEVICES FOR APPLYING FLUID COMPOSITES TO A CARRIER SHEET

CROSS-REFERENCE AND CLAIM OF PRIORITY TO RELATED APPLICATION

This application claims the benefit of and priority to U.S. Provisional Patent Application No. 61/424,869, which was filed on Dec. 20, 2010, and is incorporated herein by reference in its entirety.

TECHNICAL FIELD

The present disclosure relates generally to construction and repair materials, and more particularly to systems, methods, and devices for applying resins, epoxies, adhesives, and/or other fluid composites to a carrier sheet used in construction and repair.

BACKGROUND

Conduit assemblies, such as pipelines and hydraulic circuits, are used to transport an assortment of fluids, such as water, oil, various natural and synthetic gases, sewage, slurry, hazardous materials, and the like. Similar structures are utilized for transmitting electrical and fiber-optic cabling across vast expanses of land in establishing telecommunication networks. Modern day pipelines are formed from a variety of materials, including concrete, plastic (e.g., polyvinyl chloride, polyethylene, etc.), and various metallic materials, such as iron, copper, and steel. The outer surfaces of metal pipes are oftentimes provided with a corrosion resistant outer coating, especially when used in outdoor applications.

Pipelines may require repair over their operational lifetime, for example, due to structural degradation, corrosion, inadvertent damage, etc. Unrepaired leaks can increase health and environmental risks for employees and the public population, especially when the pipeline is carrying hazardous materials, natural gas, oil, or sewage. There are various systems available for repairing pipe leaks. One known repair kit includes a deformable leak sealant that covers the leak site, and a pressure sealant that surrounds and compresses the leak sealant. An encapsulator is wrapped around the leak sealant and pressure sealant, providing a rock-hard shield to the repair assembly.

In the foregoing exemplary repair and sealant assemblies, the outer wrap may comprise a fiberglass cloth that is impregnated with a resinous pliable-plastic chemical composite. These repair and sealant assemblies may require mixing the various resin or epoxy chemicals together in a container while out in the field. The carrier sheet is then impregnated with the resin/epoxy, for example, by manually submerging the carrier sheet in the chemical container. Once the carrier sheet is properly saturated, it is then withdrawn from the container and applied to the sealing region or repair site of the pipe. Alternatively, the carrier sheet is stretched out on a plastic sheet or a work surface, and the resin/epoxy is applied with a roller or other appropriate instrumentality. Less than optimal working conditions, such as windy weather or uneven working surfaces, make it difficult or impossible to properly impregnate the cloth and can cause contamination from soil and debris. In addition, it can be very difficult to achieve an ideal carrier-to-resin ratio while out in the field when manually impregnating the cloth in the foregoing manners.

SUMMARY

Systems, methods, and devices are disclosed herein for applying fluid composites, such as resins, epoxies, and adhesives, to a carrier sheet, such as a cloth tape. For example, some aspects are directed to a container with openings at each end thereof to allow the entrance and exit of a cloth carrier. The container has a basin within which the resin can be introduced and/or mixed. The cloth is drawn through the basin of the container such that the cloth carrier is coated and/or impregnated with the resin. Internal guide features cause the cloth to pass through the resin regardless of the level of the resin in the container. One or more scraping surfaces are provided at the distal end of the container to remove excess resin and to provide an ideal resin-to-cloth ratio.

According to aspects of the present disclosure, a fluid-administering apparatus for applying a fluid composite to a carrier sheet is presented. The apparatus includes a support frame with a container buttress, and a container removably received within the container buttress of the support frame. The container has a basin for holding the fluid composite, a lid covering the basin, and first and second scraping surfaces. The container also has first and second slots, each of which is defined through a respective opposing side of the container. The carrier sheet passes through the first slot, traverses down into the basin through the fluid composite, slides over the first scraping surface then under the second scraping surface, and passes out through the second slot.

According to other aspects of the present disclosure, a container for applying a fluid composite to a carrier sheet is disclosed. The container includes a basin configured to hold the fluid composite, a lid covering the basin, and first and second spaced and generally opposing scraping surfaces. The container also includes first and second slots, each of which is defined through a respective opposing side of the container. The carrier sheet passes through the first slot, traverses down into the basin through the fluid composite, a first side of the carrier sheet slides across the first scraping surface, a second side of the carrier sheet then slides across the second scraping surface, and the carrier sheet passes out of the container through the second slot.

According to other aspects of the present disclosure, a method of impregnating an elongated carrier sheet with a resin is featured. The method includes: supplying a container with a basin configured to hold the resin, a lid configured to cover the basin, first and second generally opposing scraping surfaces each configured to scrape the carrier sheet, first and second slots each defined through a respective opposing side of the container, and at least one guide rod mounted within the basin; passing a leading segment of the carrier sheet down into the basin and underneath the at least one guide rod; pouring the resin into the basin; covering the basin with the lid; pulling the leading segment of the carrier sheet through the resin; sliding a first side of the carrier sheet across the first scraping surface; sliding a second side of the carrier sheet across the second scraping surface; and pulling the leading segment of the carrier sheet out of the container through the second slot.

The above summary is not intended to represent each embodiment or every aspect of the present disclosure. Rather, the foregoing summary merely provides an exemplification of some of the novel features included herein. The above features and advantages, and other features and advantages of the present disclosure, will be readily apparent from the following detailed description of the embodiments and best modes for carrying out the present invention when taken in connection with the accompanying drawings and appended claims.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

This disclosure is susceptible of embodiment in many different forms. There are shown in the drawings and will herein be described in detail representative embodiments of the invention with the understanding that the present disclosure is to be considered as an exemplification of the principles of the invention and is not intended to limit the broad aspect of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, the singular includes the plural and vice versa (unless specifically disclaimed); the words "and" and "or" shall be both conjunctive and disjunctive (unless specifically disclaimed); the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof Systems, methods, and devices are disclosed herein for applying fluid composites, such as resins, epoxies, and adhesives, to a carrier sheet, such as cloth tapes and cloth sheets. An advantage of one or more of the disclosed concepts includes providing a more secure and controlled environment for applying the fluid to the carrier. In so doing, labor time and costs are minimized. In addition, inadvertent waste resulting from contaminated composites or improperly applied resins is reduced. One or more of the disclosed concepts also helps to ensure the carrier contains the appropriate amount of fluid. In so doing, the resultant seals are more structurally sound and reliable.

Figure 1:
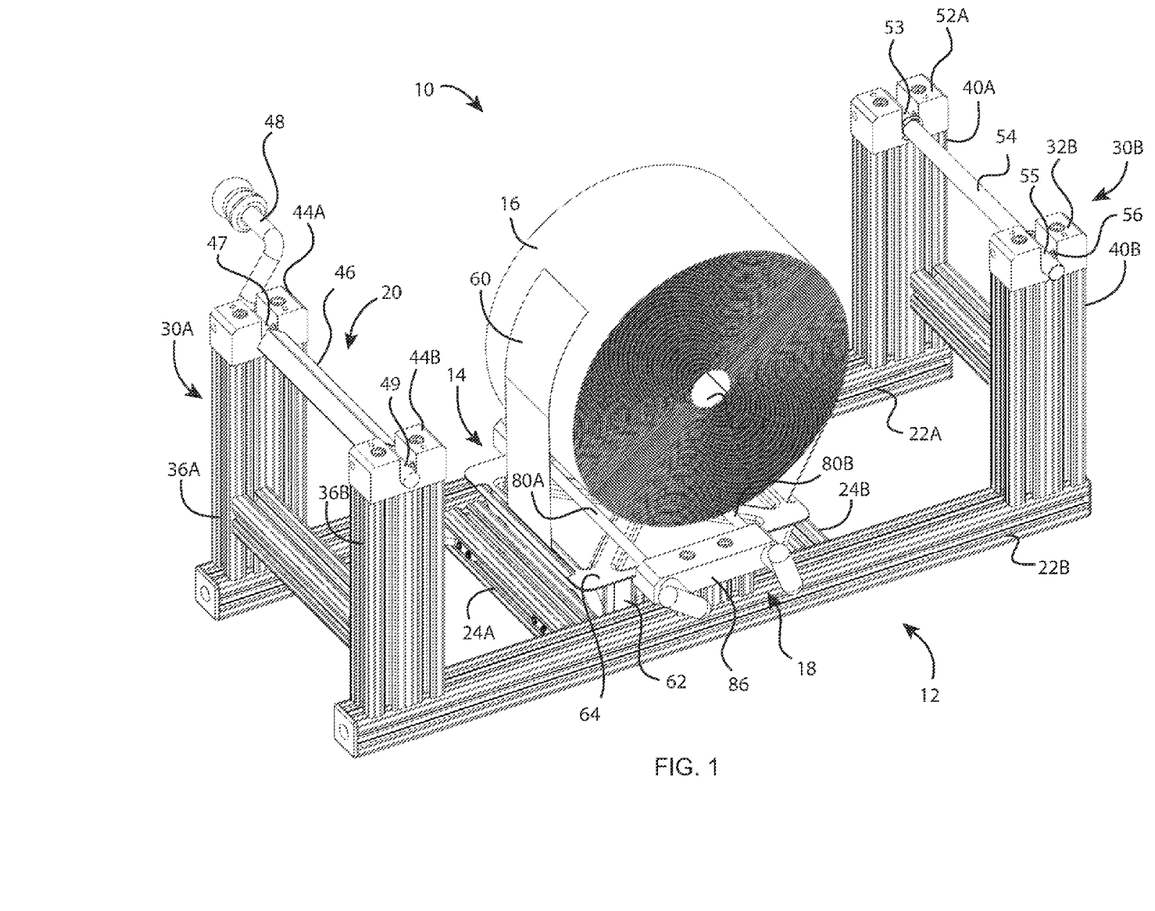
FIG. 1 is an elevated, perspective-view illustration of an exemplary apparatus for applying fluid composites to a carrier sheet in accordance with aspects of the present disclosure.

Referring now to the drawings, wherein like reference numerals refer to like components throughout the several views, FIG. 1 illustrates a fluid-administering apparatus, designated generally as 10, in accordance with embodiments of the present disclosure. Many of the disclosed concepts are discussed with reference to construction and repair materials for pipeline assemblies; however, the concepts of the present disclosure are not so limited. By way of non-limiting example, the resin-impregnated tapes that can be produced by the fluid-administering apparatus 10 may be employed for repairing cracks, holes, and dents in the hulls and bodies of boats and land vehicles, leaks in gas and liquid conduits, such as sewage pipes and water pipes, and leaks in gas and liquid tanks and other containers; repairing fractured poles, booms, spars, antennas, and the like, and strengthening similar structures that are not otherwise damaged or in need of repair; patching roofs, gutters, and drainpipes; sealing leaking containers, such as air-conditioning systems, swimming pools, and hydraulic hoses; and electrically insulating all manner of articles. In addition, it should be understood that the drawings are not necessarily to scale and are provided purely for descriptive purposes; thus, the individual and relative dimensions of the drawings presented herein are not to be considered limiting.

The fluid-administering apparatus 10 exemplified in FIG. 1 includes a support frame 12 and a fluid container 14. The frame 12 is desirably fabricated from a rigid material, which may include, but is not limited to, metals, such as aluminum and steel, polymers, such as polyvinyl chloride (PVC) and polyethylene terephthalate (PET), wood, glass-fiber composites, polyoxymethylene (POM) plastic, etc. The frame 12 is shown in the drawings comprising a tubular structure with two elongated, generally square-shaped base beams 22A and 22B that are longitudinally oriented and generally parallel to one another. The base beams 22A, 22B are connected by two laterally oriented, generally square-shaped cross-beams 24A and 24B that are generally orthogonal to and extend between the two base beams 22A, 22B. Although alternate means of attachment are available, the illustrated embodiment shows the base beams 22A, 22B rigidly fastened to the cross-beam 24A, 24B via a number of triangular brackets 28, at least three of which are partially visible in FIG. 3. The base beams 22A, 22B and cross-beam 24A, 24B cooperatively define a container buttress, designated generally as 26 in FIG. 3. The container buttress 26 is designed to receive therein and operatively retain the container 14. Optional end plugs 32 can be inserted into the open ends of the laterally-oriented cross-beams 18A-B for aesthetic and/or safety purposes.

Figure 2:
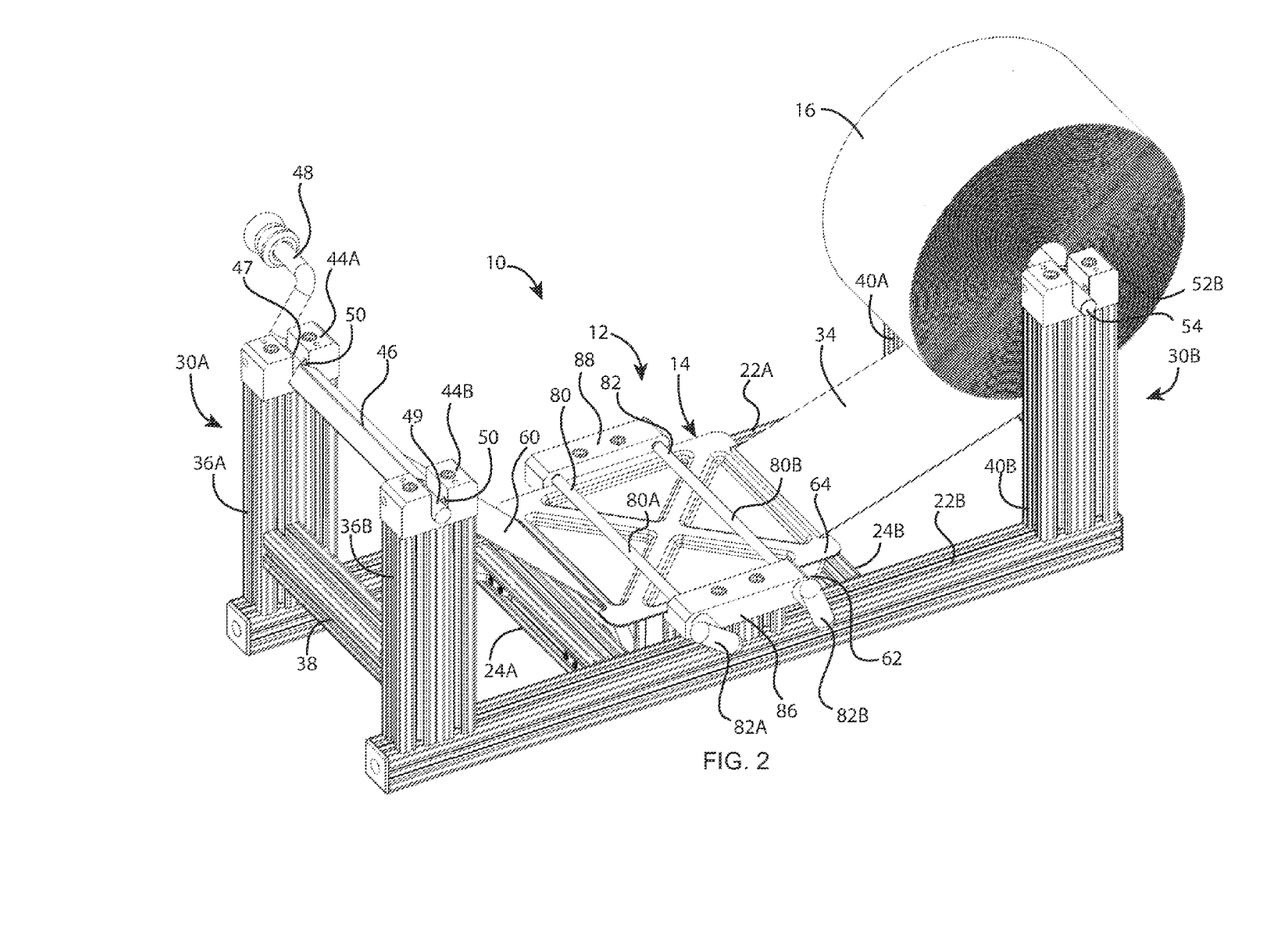
FIG. 2 is an elevated, perspective-view illustration of the apparatus of FIG. 1 showing the feeder roll and the take-up roll operatively mounted on respective support armatures.
Figure 3:
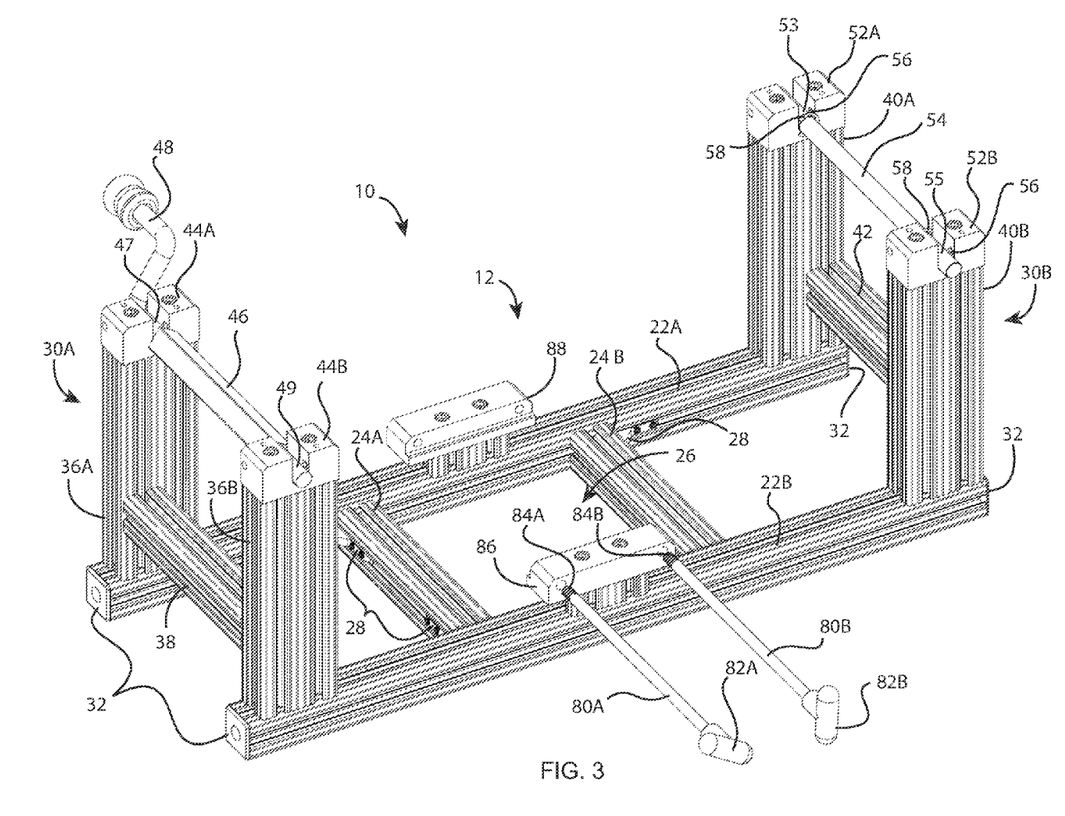
FIG. 3 is a partially-exploded, perspective-view illustration of the apparatus of FIG. 1 with the feeder roll, the take-up roll, the container, and the container cover removed.

It is contemplated that the support frame 12 comprise fewer or greater than the various beams 22A, 22B, 24A, 24B illustrated in FIGS. 1-3. Moreover, the length, width, and height of the individual beams 22A, 22B, 24A, 24B and, thus, the frame 12 can be modified, for example, to accommodate a particular work site and/or intended application of the fluid-administering apparatus 10. It is likewise contemplated that one or more or all of the beams can be replaced with alternate structure, such as a base plate, box, or other unitary structure, for example. To that end, the base beams 22A, 22B and cross-beam 24A, 24B are exemplified in the drawings as elongated, hollow tubes; alternatively, the beams 22A, 22B, 24A, 24B can be fabricated as solid bars, and may take on alternative geometries.

A first support armature, which is generally designated as 30A in FIGS. 1-3, extends transversely across the front of the frame 12, located on a first side of the container buttress 26. A second support armature, which is generally designated as 30B in FIGS. 1-3, extends transversely across the back of the frame 12, located on a second side of the container buttress 26 opposite the side of the first support armature 30A. The first support armature 30A has two generally parallel tower arms:

a first rectangular-shaped tower arm 36A that is generally orthogonal to and extends upward from the first base beam 22A, and a second rectangular-shaped tower arm 36B that is generally orthogonal to and extends upward from the second base beam 22B. The tower arms 36A, 36B are connected by a laterally oriented, generally square-shaped tower cross-beam 38 that is generally orthogonal to and extends between the two tower arms 36A, 36B. Similar to the first support armature 30A, the second support armature 30B has two generally parallel tower arms: a first rectangular-shaped tower arm 40A that is generally orthogonal to and extends upward from the first base beam 22A, and a second rectangular-shaped tower arm 40B that is generally orthogonal to and extends upward from the second base beam 22B. The tower arms 40A, 40B are connected by a laterally oriented, generally square-shaped tower cross-beam 42 that is generally orthogonal to and extends between the two tower arms 40A, 40B. The tower arms 40A, 40B, in some embodiments, are foldable on and/or are removable from the first and second base beams 22A, 22B to reduce the overall packaging volume of the fluid-administering apparatus 10 for ease of shipping and/or storage.

Like the support frame 12, it is contemplated that the support armatures 30A, 30B comprise fewer or greater than the various arms and beams illustrated in FIGS. 1-3. Moreover, the length, width, and height of the individual arms 30A, 30B, 40A, 40B and cross-beams 38, 42 can be modified, for example, to accommodate a particular work site and/or intended application of the fluid-administering apparatus 10. It is likewise contemplated that one or more or all of the arms and beams can be replaced with alternate structure and may take on alternative geometries.

As seen in FIG. 2, the first support armature 30A is configured to rotatably support a take-up roll 20 for the carrier sheet 34. In particular, each of the tower arms 36A, 36B of the first support armature 30A includes a respective U-shaped spool bracket 44A and 44B mounted on a top end thereof, as best seen in FIGS. 1 and 3. These spool brackets 44A, 44B rotatably mounted the take-up roll 20 to the first support armature 30A. In the illustrated embodiment, the take-up roll 20 has a generally square-shaped spool 46 that is attached to a crank arm 48. The crank arm 48 includes two cylindrical ends: a first cylindrical end 47 extends from a first side of the spool 46 and is received by the first spool bracket 44A, and a second cylindrical end 49 extends from a second side of the spool 46 opposite the first side and is received by the second spool bracket 44B. The ends 47, 49 of the crank arm 48 are retained in the brackets 44A, 44B via displaceable locking pins 50. The lateral ends of the square-shaped spool 46 ensure that the spool 46 stays centered on the support armature 30B. The crank arm 48 is operable to turn the spool 46 and thereby draw the carrier sheet 34 from the feed roll 16 through the container 14 to the take-up roll 20. The foregoing arrangement allows a user to easily and quickly attach take-up rolls 20 to and detach take-up rolls 20 from the support frame 12. In alternative arrangements, the rotation of the take-up roll 20 and/or feed roll 16 can be automated, for example, by an electric motor.

The second support armature 30B is configured to rotatably support a feed roll 16 of carrier sheet 34, as seen in FIG. 2. In particular, each of the tower arms 40A, 40B of the second support armature 30B includes a respective U-shaped spool bracket 52A and 52B mounted on a top end thereof, as best seen in FIGS. 1 and 3. These spool brackets 52A, 52B rotatably mount the feed roll 16 to the second support armature 30B. In the illustrated embodiment, a generally cylindrical spool 54 passes through a central slot 17 (FIG. 1) of the feed roll 16. The spool 54 has two cylindrical ends, a first cylindrical end 53 extends from a first side of the feed roll 16 and is received by the first spool bracket 52A, and a second cylindrical end 55 extends from a second side of the feed roll 16 opposite the first side and is received by the second spool bracket 52B. The ends 53, 55 of the cylindrical spool 54 are retained in the brackets 52A, 52B via displaceable locking pins 56. Retention rings 58 proximate the ends 53, 55 of the spool 54 ensure that the spool 54 stays centered on the support armature 30B. The foregoing arrangement allows a user to easily and quickly attach feed rolls 16 to and detach feed rolls 16 from the support frame 12.

In the illustrated embodiment, the carrier sheet 34 is a cloth tape that is approximately 15.2 meters (50 feet) long, 152.4 mm (six inches) wide and 2 mm (0.079 inches) thick. However, the dimensions of the carrier sheet 34 can be varied from that of the illustrated embodiment. By way of non-limiting example, the width of the carrier sheet 34 range anywhere from 2 inches to 12 inches. Likewise, the thickness and length of the carrier sheet 34 can also be increased or decreased. The carrier sheet 34 can be fabricated from a variety of cloth and non-cloth materials. For instance, the carrier sheet 34 can be fabricated from a fiberglass composite material, such as, for example, a continuous-filament or a woven-filament fiberglass cloth, which may be provided with warp yarns and filling yarns. A leading edge of the carrier sheet 34 can be provided with an adhesive take-up tape 60, which can be used for packaging purposes, such as attaching the feed roll 16 to the container 14 as seen in FIG. 1, and for operatively attaching the leading edge of the carrier sheet 34 to the take-up roll 20.

Figure 4:
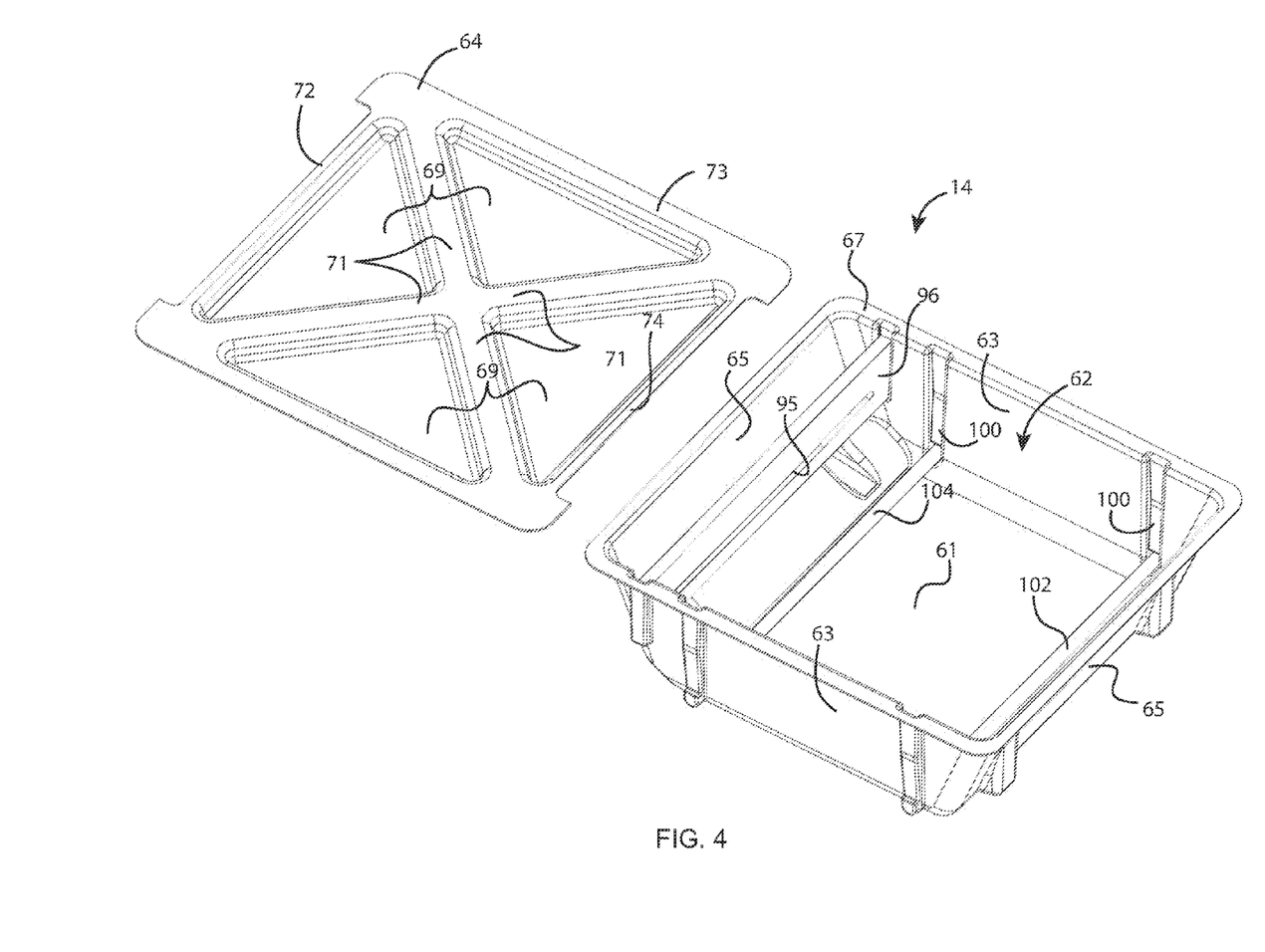
FIG. 4 is a perspective-view illustration of the container and the container cover of FIG. 1.

With reference to FIGS. 2 and 4, the container 14 is removably received within the container buttress 26 of the support frame 12. In the illustrated example, the container 14 is a single-piece, polyhedral bin having a basin, designated generally as 62 in FIG. 4, and a lid 64 for covering the basin 62. It may be desirable that the basin 62 be watertight or otherwise leak resistant, and fabricated from a material that is inert or non-reactive with fluid composite materials that may be placed in the basin 62. In some embodiments, the basin 62 is hydroformed from polyethylene terephthalate (PET), polyethylene terephthalate glycol (PETG), polyolefin (PO), etc. The basin 62 comprises two sidewalls 63 integrally formed with two end walls 65, all of which extend generally upward from an integral base 61 to collectively form a continuous perimeter. A flange 67 extends laterally outward from a top edge of the sidewalls 63 and end walls 65. It should be recognized that the dimensions and geometric configuration of the basin 62 can be modified from that shown in the drawings without departing from the scope and spirit of the present disclosure. For example, the basin 62, in some embodiments, can be shaped or sloped to ensure optimal use of most or all of the composite fluid in the container 14.

Figure 6:
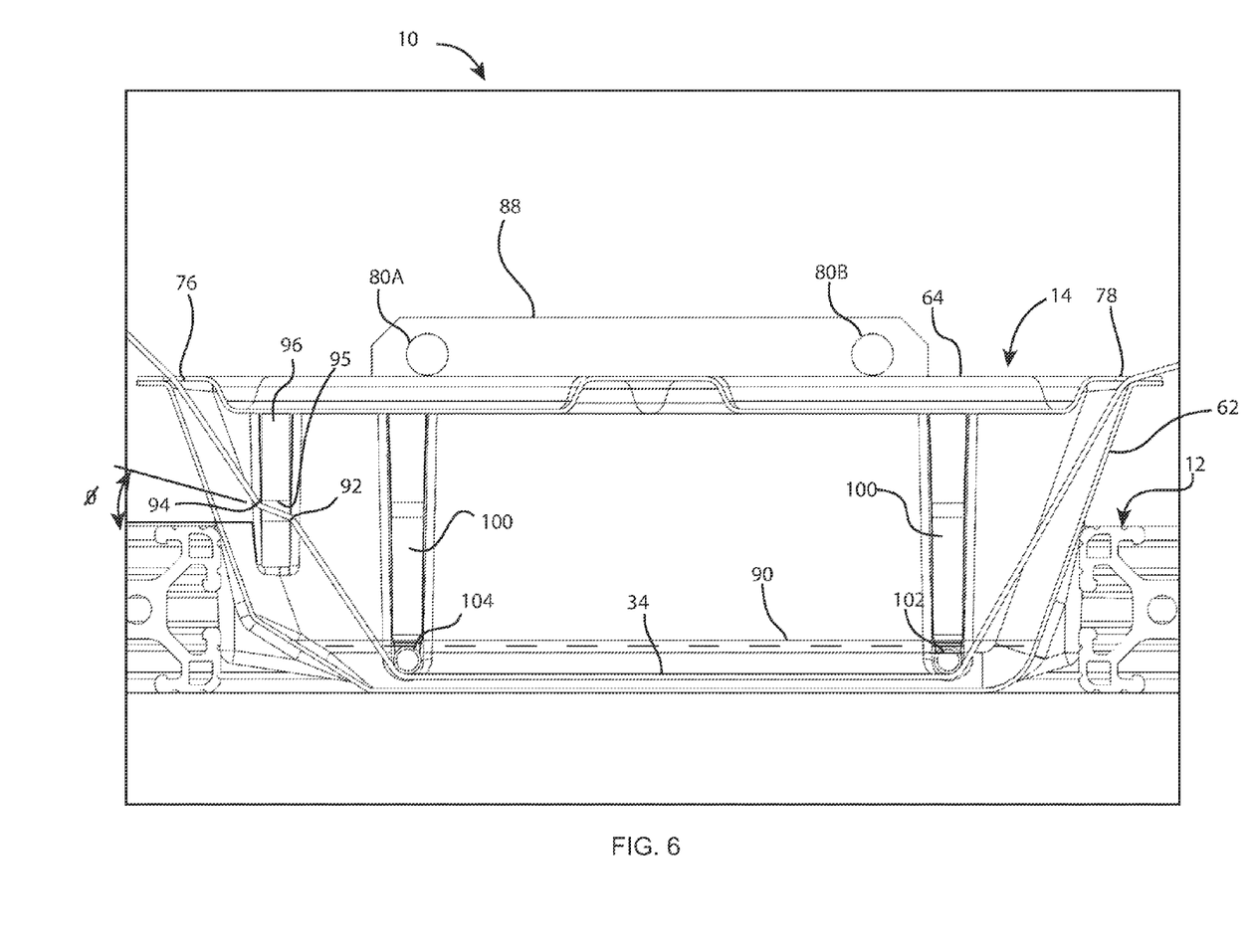
FIG. 6 is an enlarged, side-view illustration of the apparatus of FIG. 1 partially cut away to show the feed path of the carrier sheet inside the container.

The exemplary lid 64 of FIG. 4, like the basin 62, is a single-piece, generally rectangular structure that may be hydroformed or pressed from PETG. The lid 64 has a plurality of recessed segments 69 that are interconnected with reinforcing ribs 71. A perimeter flange 73 generally surrounds and extends laterally outward from the recessed segments 69 of the lid 64. During normal use, the lid 64 is placed on top of the basin 62, extending across the upper extent thereof, with the perimeter flange 73 of the lid 64 resting on top of the flange 67 of the basin 62, as seen in FIGS. 2 and 6. The recessed segments 69 of the lid 64 project downward into the basin 62 and cooperate with the basin 62 to ensure that the lid 64 is properly oriented on and aligned with the basin 62. When properly seated on the basin 62, first and second indentations 72 and 74, respectively, at the forward and rearward edges of the lid 64 cooperate with the basin 62 to define slots 76 and 78 (FIG. 6) at opposing sides of the container 14. Although shown as two separate parts, the basin 62 and lid 64 can be integrally formed as a single-piece structure, or can be attached, for example, by a pivot hinge or other attachment means. Additionally, similar to the basin 62, the dimensions and geometric configuration of the lid 64 can be modified from that shown in the drawings without departing from the scope and spirit of the present disclosure.

The fluid-administering apparatus 10 can be provided with an optional locking mechanism for securing the container 14 to the support frame 12, namely within the container buttress 26. In the representative arrangement illustrated in FIGS. 2 and 3, the locking mechanism includes first and second generally cylindrical locking rods 80A and 80B, respectively, that extend transversely across and abut the lid 64 of the container 14. FIG. 3 shows each of the locking rods 80A, 80B comprising a respective handle 82A and 82B at one end thereof, and a respective threaded tip 84A, 84B at the opposite end thereof. Once the fluid container 14 is properly nested within the container buttress 26, and the lid 64 is placed on top of the basin 62, each of the locking rods 80A, 80B is passed through a complementary receiving slot in a first lock tower 86 that is attached to the second base beam 22B of the support frame 12. As the locking rods 80A, 80B are passed through the first lock tower 86, the threaded tips 84A, 84B of the locking rods 80A, 80B are pressed into complementary threaded slots in a second lock tower 88 that is attached to the first base beam 22A of the support frame 12. The locking rods 80A, 80B are then secured or torqued (e.g., turned in a clockwise direction with respect to FIG. 3) to threadably mate the threaded tips 84A, 84B with the second lock tower 88.

The fluid-administering apparatus 10 is intended for applying fluids and fluid composites 90 (FIG. 6), such as resins, epoxies, and adhesives, to the carrier sheet 34. The container 14 is designed to hold and protect the fluid composite 90 during operation of the fluid-administering apparatus 10. The container 14 can come prepackaged with the fluid composite 90, the fluid composite 90 can be poured into the basin 64, or the constituent parts of the fluid composite 90 can be packaged separately and mixed in the basin 64. The fluid composite 90 can take on various forms, including, for example, an ether resin or an epoxy resin. By way of example, and not limitation, the fluid composite 90 may comprise, for example, polyol, diisocyanate, titanium dioxide, tinivun, and phosphoric acid. Alternatively, the fluid composite 90 may comprise a resin that is light-cured (e.g., via UV or LED spot curing), heat-cured (i.e., thermoset), or set by mixing one part of the resin with another compound, or any combination thereof. For example, epoxy copolymers may be hardened as a result of mixing an epoxide resin with a polyamine monomer "hardener". Other alternative makeups, such as expanding compounds and resins, are also envisioned as being within the scope and spirit of the present disclosure.

Turning next to FIG. 6, the container 14 includes a plurality of scraping surfaces, which are represented in the drawings by first and second scraping surfaces 92 and 94, respectively. Specifically, the illustrated embodiment shows a single-piece scraper blade 96 mounted to the container 14 (e.g., via friction fit, press fit, adhesives, threaded fasteners, heat stakes, etc.) within the basin 62. An elongated channel 95, which is wider than the width of the carrier sheet 34, extends through the scraper blade 96. As seen in FIG. 6, the first scraping surface 92 includes a first sharp edge of the scraper blade 96 located proximate the entrance of the channel 95 (i.e., the opening where the carrier sheet 34 enters the scraper blade 96), whereas the second scraping surface 94 includes a second sharp edge of the scraper blade 96 located proximate an exit of the channel 95 (i.e., the opening where the carrier sheet 34 exits the scraper blade 96). The first scraping surface 92 is spaced from and generally opposed to the second scraping surface 94. The carrier sheet 34 passes from the first scraping surface 92 of the scraper blade 96, through the channel 95, to the second scraping surface 94 at an angle $\Phi$. In some embodiments, the angle $\Phi$ is approximately 25-55 degrees from horizontal. In some embodiments, the angle $\Phi$ is approximately 35-45 degrees from horizontal. In some embodiments, the angle $\Phi$ is approximately 42 degrees from horizontal.

The carrier sheet 34 is coated and/or impregnated with the fluid composite 90 when passing through the basin 62 of the container 14. The first and second scraping surfaces 92, 94 are operable to remove excess fluid composite 90 from the carrier sheet 34. By reducing the amount of fluid composite 90 borne by the carrier sheet 34, the scraping surfaces 92, 94 can ensure the carrier sheet 34 is impregnated with or otherwise carries a predetermined amount of fluid composite 90. In some embodiments, the scraping surfaces 92, 94 cooperatively reduce the fluid-to-cloth content ratio of the fluid composite 90 to approximately 30-65%. In some embodiments, the scraping surfaces 92, 94 cooperatively reduce the fluid-to-cloth content ratio of the fluid composite 90 to approximately 40-70%. In some embodiments, the scraping surfaces 92, 94 cooperatively reduce the fluid-to-cloth content ratio of the fluid composite 90 to approximately 50%. In some embodiments, the scraping surfaces 92, 94 cooperatively reduce the fluid-to-cloth content ratio of the fluid composite 90 to approximately 70%. The size and shape of the channel 95, as well as the orientation, sharpness, and displacement of the scraping surfaces 92, 94, can be modified, for example, to ensure the carrier sheet 34 is impregnated with different predetermined amounts of resin. For instance, the height of the channel 95, and thus the angle $\Phi$ of translation of the carrier sheet, can be increased or decreased to thereby respectively decrease or increase the tension on the carrier sheep applied by the scraping portions of the scraper blade 96. Alternatively, the angle and/or orientation of the scraper blade 96 can be varied to ensure the carrier sheet 34 is impregnated with a predetermined amount of resin.

Figure 5:
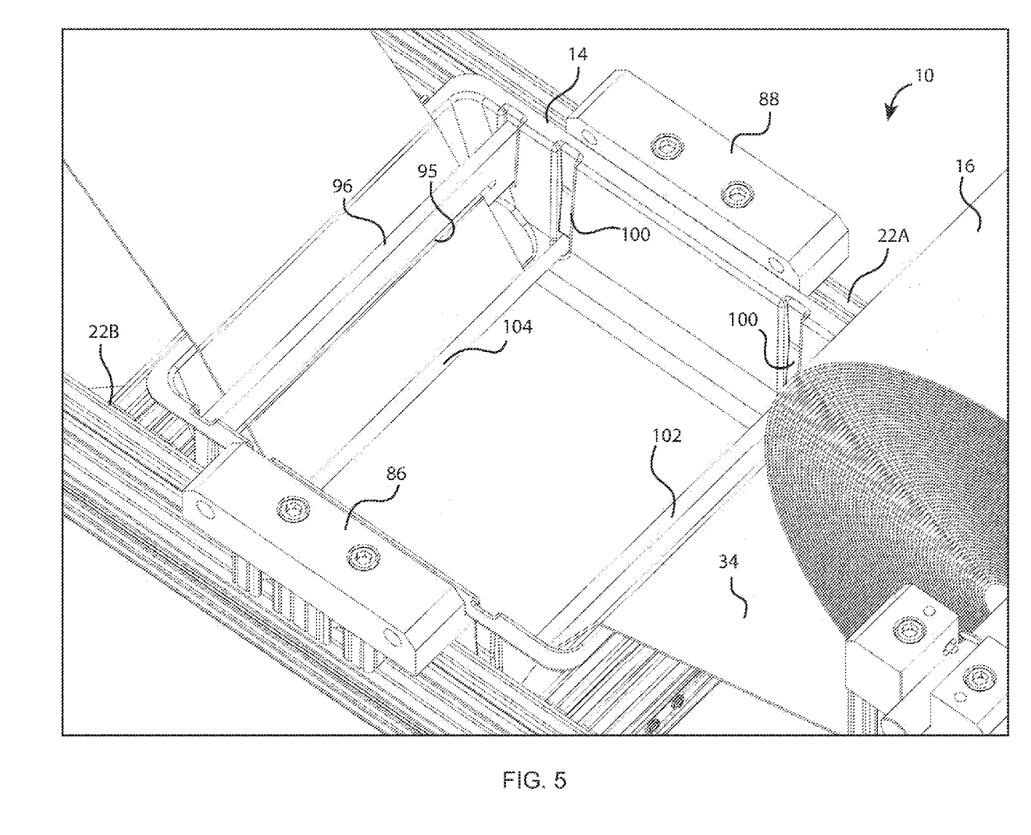
FIG. 5 is an enlarged, perspective-view illustration of the apparatus of FIG. 1 with the container cover removed to show the orientation of the carrier sheet inside the container.

The exemplary container 14 also includes two cylindrical guide rods, respectively designated 102 and 104 in FIGS. 4-6, that are mounted to the container 14, e.g., via undercuts 100 or snap tabs (see FIG. 7), extending transversely across the basin 92. The first guide rod 102 directs the carrier sheet 34 from the first slot 78 down into the lower portion of the basin 62 and into the fluid composite 90. The second guide rod 104 is generally parallel to and horizontally spaced from the first guide rod 102. The second guide rod 104 directs the carrier sheet 34 from the first guide rod 102, through the basin 62 and the fluid composite 90, and into sliding contact with the scraper blade 96 and, thus, the first and second scraping surfaces 92 and 94. It is feasible, in alternative embodiments, to have a single guide rod or to have more than two guide rods (e.g., three or more). In addition, the distance between the guide rods 102, 104 can be modified, for example, depending on the type of carrier sheet being treated, the type of resin being applied to the carrier sheet, the size of the container, and/or the amount of fluid that needs to be applied. Moreover, the guide rods can be snap fit into engagement with the container 14, as described below with respect to the embodiment of FIG. 7.

During normal operation, the carrier sheet 34 is pulled off of or fed from the feed roll 16 into the container 14, passing through the first slot 78. The carrier sheet 34, as seen in FIG. 6, then traverses down into the basin 62, under the first guide rod 102, and through the fluid composite to the second guide rod 104. Next, the carrier sheet 34 passes under the second guide rod 104 and upward to the scraper blade 96, where the carrier sheet 34 passes over the first scraping surface 92 such that a first side of the carrier sheet 34 slides or scrapes across the sharp edge of the first scraping surface 92. From there, the carrier sheet 34 passes under the second scraping surface 94 such that a second side of the carrier sheet 34, opposite the first side thereof, slides or scrapes across the sharp edge of the second scraping surface 94. The carrier sheet 34 then passes out of the container 12 via the second slot, and winds onto the take-up roll 20. The container can be provided with a variety of guide mechanisms (not shown) that ensure the carrier sheet 34 runs straight while traversing through and in the box (e.g., to avoid snags).

Figure 7:
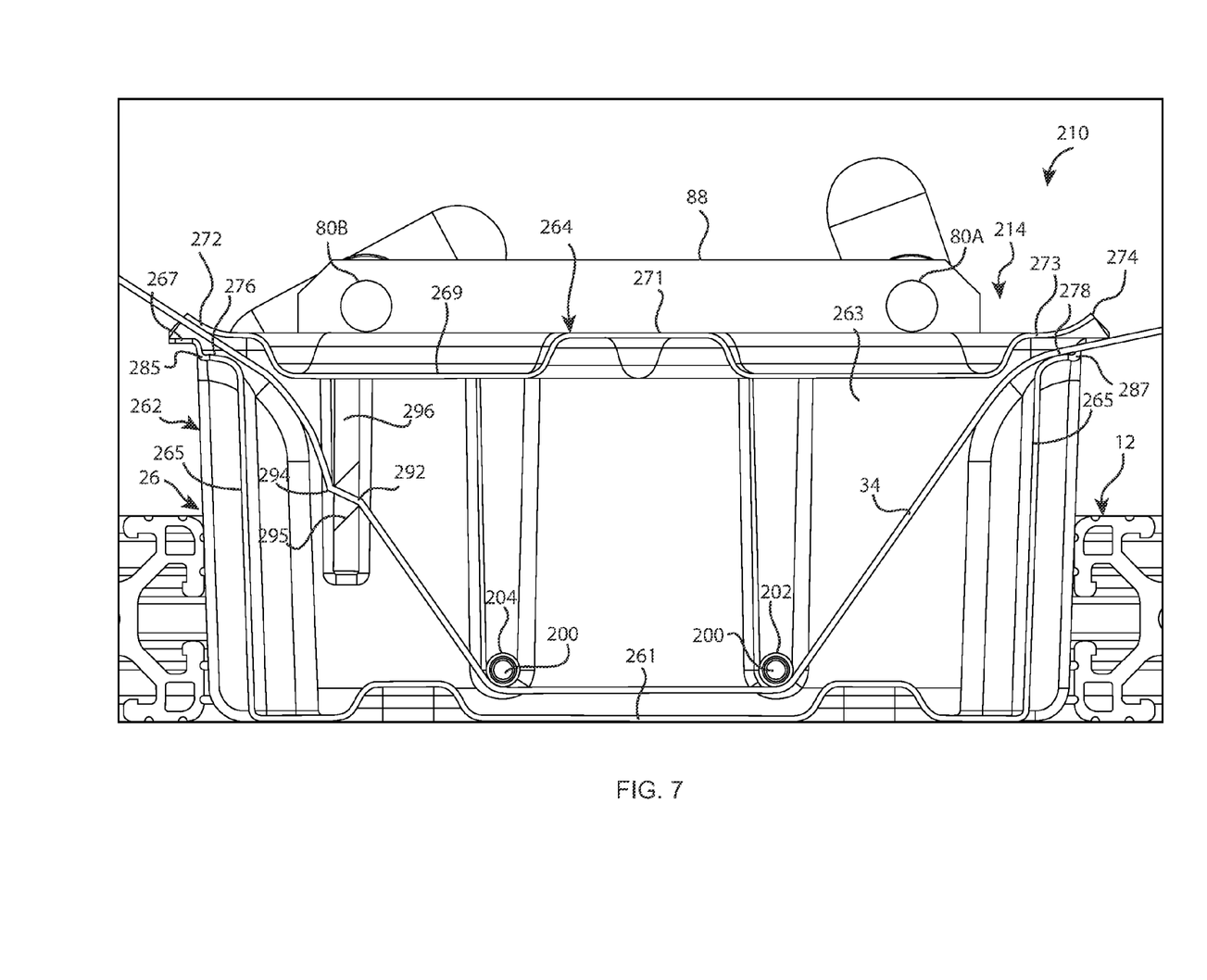
FIG. 7 is an enlarged, partially cut away, side-view illustration of another apparatus for applying fluid composites to a carrier sheet.

Turning next to FIG. 7, wherein like reference numerals refer to like components from FIGS. 1-6, an enlarged, partially cut away, side-view illustration is provided of another apparatus 210 for applying fluid composites to a carrier sheet. The fluid-administering apparatus 210 exemplified in FIG. 7 includes a support frame 12 and a fluid container 214. Similar to the embodiments shown in FIGS. 1-6, the container 214 of FIG. 7 is removably received within a container buttress 26 of the support frame 12. In the illustrated example, the container 214 is a single-piece bin having a basin 262 and a lid 264 for covering the basin 262. It may be desirable that the basin 262 be watertight or otherwise leak resistant. The basin 262 comprises two sidewalls 263 (one of which is visible in FIG. 7) that are integrally formed with two end walls 265, all of which extend generally upward from an integral base 261 to collectively form a continuous perimeter. A flange 267 extends laterally outward from a top edge of the sidewalls 63 and end walls 65.

The exemplary lid 264 of FIG. 7, like the basin 262, is a single-piece, generally rectangular structure with a plurality of recessed segments 269 that are interconnected with reinforcing ribs 271. A perimeter flange 273 generally surrounds and extends laterally outward from the recessed segments 269 of the lid 264. During normal use, the lid 264 is placed on top of the basin 262, extending across the upper extent thereof, with the perimeter flange 273 of the lid 264 resting on top of the flange 267 of the basin 262, as seen in FIG. 7. The recessed segments 269 of the lid 264 project downward into the basin 262 and cooperate with the basin 262 to ensure that the lid 264 is properly oriented on and aligned with the basin 262. When properly seated on the basin 262, first and second flared pockets 272 and 274, respectively, at the forward and rearward edges of the lid 264 cooperate with first and second indentations 285 and 287, respectively, in the forward and rearward end walls 265 of the basin 262 to define slots 276 and 278 (FIG. 6) at opposing sides of the container 214. Although shown as two separate parts, the basin 262 and lid 264 can be integrally formed as a single-piece structure, or can be attached, for example, by a pivot hinge or other attachment means. It should be recognized that the dimensions and geometric configuration of the basin 262 and lid 264 can be modified from that shown in the drawings without departing from the scope and spirit of the present disclosure. In some embodiments, the flared ends of the lid pockets 272 and 274 act as guide surfaces, operable to align (e.g., center) the carrier sheet 34 as it is traversing through the container 214. Moreover, the flared end of the pocket 272, in some embodiments, can be shaped and oriented to provide an additional scraping surface.

The container 214 of FIG. 7 includes a plurality of scraping surfaces, which are represented in the drawings by first and second scraping surfaces 292 and 294, respectively. In the illustrated embodiment, a single-piece scraper blade 296 attached to the container 214 within the basin 262. An elongated channel 295 extends through the scraper blade 96 at a downward angle. The elongated channel 295 is wider than the width of the carrier sheet 34. As seen in FIG. 7, the first scraping surface 292 includes a first sharp edge of the scraper blade 296 located proximate where the carrier sheet 34 enters the channel 295, whereas the second scraping surface 94 includes a second sharp edge of the scraper blade 296 located proximate where the carrier sheet 34 exits of the channel 295. The first scraping surface 292 is spaced from and generally opposed to the second scraping surface 294. The carrier sheet 34 passes from the first scraping surface 92 of the scraper blade 96, through the channel 95, to the second scraping surface 94 at an angle $\Phi$. The angle $\Phi$ of translation of the scraper sheet 34 can be varied as described above.

The carrier sheet 34 is coated and/or impregnated with the fluid composite 90 when passing through the basin 262 of the container 214. The first and second scraping surfaces 292, 294 are operable to remove excess fluid composite 90 from the carrier sheet 34. By reducing the amount of fluid composite 90 borne by the carrier sheet 34, the scraping surfaces 292, 294 can ensure the carrier sheet 34 is impregnated with or otherwise carries a predetermined amount of fluid composite 90. The scraping surfaces 292, 294 can cooperatively reduce the fluid-to-cloth content ratio of the fluid composite 90 to any of the ranges and percentages described above with respect to the embodiments of FIGS. 1-6. In addition, like the embodiments of FIGS. 1-6, the size and shape of the channel 295 of FIG. 7, as well as the orientation, sharpness, and displacement of the scraping surfaces 292, 294 of FIG. 7, can be modified, for example, to ensure the carrier sheet 34 is impregnated with other predetermined amounts of fluid composite.

The exemplary container 214 also includes two cylindrical guide rollers, respectively designated 202 and 204 in FIG. 7, that are mounted to the container 214, e.g., via press-fitting the rollers 202, 204 onto locking dimples 200. The first guide roller 202 directs the carrier sheet 34 from the first slot 278 down into the lower portion of the basin 262 and into the fluid composite 90. The second guide roller 204 is generally parallel to and horizontally spaced from the first guide roller 202, both of which extend transversely across the basin 262. The second guide roller 204 directs the carrier sheet 34 from the first guide roller 202, through the basin 262 and the fluid composite 90, and into sliding contact with the scraper blade 296 and, thus, the first and second scraping surfaces 292 and 294. The number, size, and orientation of the rollers can be modified, in alternative embodiments, from that shown in FIG. 7.

During normal operation, the carrier sheet 34 translates into the container 14, passing through the first slot 278 and down into the basin 262, and traversing under the first guide roller 202, through the fluid composite, to the second guide roller 204. Next, the carrier sheet 34 passes under the second guide roller 204 and upward to the scraper blade 296, where the carrier sheet 34 passes over the first scraping surface 292 such that a first side of the carrier sheet 34 slides or scrapes across the sharp edge of the first scraping surface 292. From there, the carrier sheet 34 passes under the second scraping surface 294 such that a second side of the carrier sheet 34, opposite the first side thereof, slides or scrapes across the sharp edge of the second scraping surface 294. The carrier sheet 34 then passes out of the container 212 via the second slot 276.

Also presented herein are methods of impregnating an elongated carrier sheet with a fluid composite, such as a resin. In one embodiment, the method comprises supplying a fluid container, which has a basin for holding the resin and a lid for covering the basin. The container also includes two or more generally opposing scraping surfaces, each of which is configured to scrape excess fluid off of the carrier sheet, and first and second slots, each of which is defined through a respective opposing side of the container. The container can also include one or more guide rods, which are mounted within the basin and configured for guiding the carrier sheet through the container. The method may also comprise, in alternative embodiments, rotatably mounting a feed roll of the carrier sheet proximate to the container, for example, to a support frame.

The method also includes passing a leading segment of the carrier sheet down into the basin and underneath at least one guide rod. The resin is poured into the basin. This may include, in some embodiments, pouring the constituent parts of the resin into the basin of the container and mixing the parts together. Alternatively, a premixed resin may be poured into the container (e.g., through a hole in the lid of the container or after the lid is removed). In some embodiments, the leading segment of the carrier sheet is passed down into the basin and underneath a guide rod prior to pouring the resin into the basin. In alternative embodiments, such as arrangements where the container comes pre-filled with resin, the leading segment of the carrier sheet is passed down into the basin and underneath a guide rod after the resin is poured into the basin.

The method further comprises covering the basin with the top and, in some embodiments, locking the container to a support frame. The leading segment of the carrier sheet is then pulled through the resin. This may include attaching the leading segment to a spindle on a take-up roll and, in some instances, turning the take-up roll with a crank arm. As the carrier sheet is pulled through the resin, the method then includes sliding a first side of the carrier sheet across the first scraping surface, sliding a second side of the carrier sheet across the second scraping surface, and pulling the leading segment of the carrier sheet out of the container through the second slot. The carrier sheet is covered with and, in some embodiments, impregnated with the resin when passing through the basin.

In some embodiments, the method includes at least those steps enumerated above. It is also within the scope and spirit of the present disclosure to omit steps, include additional steps, and/or modify the order presented.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A fluid-administering apparatus for applying a fluid composite to a carrier sheet, the apparatus comprising:
 a container with (i) a basin configured to hold the fluid composite, (ii) a lid configured to cover the basin such that the basin and the lid define an interior space of the container, (iii) first and second scraping surfaces located wholly within the interior space, and (iv) first and second slots each defined by a respective opposing portion of the container; and
 a support frame with a container buttress configured to receive the container,
 wherein the carrier sheet passes into the container through the first slot, traverses down into the basin through the fluid composite, slides over the first scraping surface then under the second scraping surface, and passes out of the container through the second slot.

2. The apparatus of claim 1, wherein the first scraping surface is spaced from and generally opposed to the second scraping surface.

3. The apparatus of claim 1, further comprising a scraper blade mounted to the container, the scraper blade defining therethrough an elongated channel, the first scraping surface being located proximate an entrance of the channel and the second scraping surface being located proximate an exit of the channel.

4. The apparatus of claim 1, wherein the carrier sheet passes from the first scraping surface to the second scraping surface at approximately 35-45 degrees from horizontal.

5. The apparatus of claim 1, wherein the carrier sheet is impregnated with the fluid composite when passing through the basin, and wherein the first and second scraping surfaces cooperatively reduce a fluid-to-cloth content ratio to approximately 30-65%.

6. The apparatus of claim 1, further comprising a first guide rod mounted within the basin, the first guide rod directing the carrier sheet from the first slot into the basin and into contact with the fluid composite.

7. The apparatus of claim 6, further comprising a second guide rod mounted within the basin spaced from the first guide rod, the second guide rod directing the carrier sheet into sliding contact with the first and second scraping surfaces.

8. The apparatus of claim 1, further comprising a locking mechanism configured to lock the container within the container buttress of the support frame.

9. The apparatus of claim 8, wherein the locking mechanism includes at least one locking rod that extends transversely across and abuts the lid of the container.

10. The apparatus of claim 1, wherein the support frame further comprises a first support armature on a first side of the container buttress and a second support armature on a second side of the container buttress opposite the first side, the first support armature being configured to rotatably support a feed roll of the carrier sheet, and the second support armature being configured to rotatably support a take-up roll for the carrier sheet.

11. The apparatus of claim 10, wherein the support frame further comprises a crank arm configured to turn a spool of the take-up roll and thereby draw the carrier sheet from the feed roll through the container to the take-up roll.

12. A container for applying a fluid composite to a carrier sheet, the container comprising:
 a basin configured to hold the fluid composite;
 a lid configured to cover the basin such that the basin and the lid define an interior space of the container;
 first and second spaced and generally opposing scraping surfaces located wholly within the interior space; and
 first and second slots each defined by a respective opposing side of the container,
 wherein the carrier sheet passes into the container through the first slot, traverses down into the basin through the fluid composite, a first side of the carrier sheet slides across the first scraping surface, a second side of the carrier sheet then slides across the second scraping surface, and the carrier sheet passes out of the container through the second slot.

13. The container of claim 12, further comprising a single-piece scraper blade mounted within the container, the scraper blade defining therethrough an elongated channel, the first scraping surface including a first edge located proximate an entrance of the channel and the second scraping surface including a second edge located proximate an exit of the channel.

14. The container of claim 13, wherein the carrier sheet passes from the first edge to the second edge at approximately 35-45 degrees from horizontal.

15. The container of claim 12, wherein the carrier sheet is impregnated with the fluid composite when passing through the basin, and wherein the first and second scraping surfaces cooperatively reduce a content ratio of the fluid composite to approximately 30-65%.

16. The container of claim 12, further comprising:
a first guide rod mounted to the container within the basin, the first guide rod directing the carrier sheet from the first slot downwardly in the basin and into contact with the fluid composite; and
a second guide rod mounted to the container within the basin generally parallel to and horizontally spaced from the first guide rod, the second guide rod directing the carrier sheet from the first guide rod through the basin and upwardly into sliding contact with the scraping surfaces.

* * * * *